United States Patent
Narita

(10) Patent No.: US 8,875,017 B2
(45) Date of Patent: Oct. 28, 2014

(54) INFORMATION PROCESSING APPARATUS, INFORMATION PROCESSING METHOD AND PROGRAM

(75) Inventor: Tomoya Narita, Kanagawa (JP)

(73) Assignee: Sony Corporation, Tokyo (JP)

(*) Notice: Subject to any disclaimer, the term of this patent is extended or adjusted under 35 U.S.C. 154(b) by 1134 days.

(21) Appl. No.: 12/713,990

(22) Filed: Feb. 26, 2010

(65) Prior Publication Data

US 2010/0229089 A1    Sep. 9, 2010

(30) Foreign Application Priority Data

Mar. 9, 2009  (JP) .............................. P2009-055565

(51) Int. Cl.
| | |
|---|---|
| G06F 3/01 | (2006.01) |
| G06F 3/041 | (2006.01) |
| G06F 3/0488 | (2013.01) |
| G06F 3/0486 | (2013.01) |

(52) U.S. Cl.
CPC ............ G06F 3/0486 (2013.01); G06F 3/0416 (2013.01); G06F 3/04883 (2013.01); *H04M 2250/22* (2013.01); *H04M 2250/64* (2013.01)
USPC ........................................................ 715/702

(58) Field of Classification Search
CPC .. G06F 3/0486; G06F 3/1438; G06F 3/04842
USPC ......... 715/702, 738, 739, 740, 748, 750, 751, 715/761
See application file for complete search history.

(56) References Cited

U.S. PATENT DOCUMENTS 6,545,669 B1 * 4/2003 Kinawi et al. ................. 345/173
6,874,126 B1 * 3/2005 Lapidous ...................... 715/711

FOREIGN PATENT DOCUMENTS

| | | |
|---|---|---|
| EP | 1 770 473 A2 | 4/2007 |
| JP | 09-311757 | 12/1997 |

OTHER PUBLICATIONS

Microsoft Press, "Microsoft Windows User Experience," 1999, pp. 6, 8, and 9.*
Soft32.com, "use of 2nd monitor to duplicate first," Dec. 2006, pp. 1 and 2, http://forum.soft32.com/win4/2nd-monitor-duplicate-ftopict178450.html.*

* cited by examiner

*Primary Examiner* — William Bashore
*Assistant Examiner* — Daniel Um
(74) *Attorney, Agent, or Firm* — Sherr & Jiang, PLLC

(57) ABSTRACT

There is provided an information processing apparatus including a control section which, if it is determined that a first object is selected by an operating body, causes a second object, which is obtained by duplicating a part or all of the first object, to be displayed at a predetermined position on a second display surface, and if it is determined that the second object is selected by the operating body, hides the first object displayed at the position indicated by object coordinate information and also updates the object coordinate information with in-second display surface destination coordinate information.

17 Claims, 16 Drawing Sheets

FIG.4

| OBJECT IDENTIFICATION INFORMATION | COORDINATE INFORMATION | WIDTH | HEIGHT | TYPE |
|---|---|---|---|---|
| 0001 | (1,20,30) | 10 | 10 | ENTITY |
| 0002 | (1,40,30) | 10 | 10 | ENTITY |
| 0003 | (1,55,10) | 10 | 10 | ENTITY |

INFORMATION PROCESSING APPARATUS, INFORMATION PROCESSING METHOD AND PROGRAM

BACKGROUND OF THE INVENTION

1. Field of the Invention

The present invention relates to an information processing apparatus, an information processing method, and a program.

2. Description of the Related Art

There is disclosed a technology which enables to input coordinates of one continuous line in the case where a plurality of coordinate input parts are used as one integrated coordinate input part and if a pen is moved from one point on an individual coordinate input part to another individual coordinate input part (for example, see Japanese Patent Application Laid-Open No. 9-311757). According to the technology, in the case where a plurality of screens for inputting coordinates are present, it is possible to input coordinates of one continuous line, but it may be impossible to move an object or the like displayed on the screen from one screen to another screen.

Further, in recent years, there have appeared devices such as mobile phones and game machines each having two screens. However, most of those devices often have one of the screens formed of a touch panel and the other screen formed of a screen only having a display function. It is difficult to communicate between the two screens, and, because of the fact that only one of the screens is the touch panel, there are many cases where the fact confuses the users.

Most of the devices having two screens are each in a foldable form, and there is a hinge between those two screens. Accordingly, in between the screens of the device which includes two screens each formed of a touch panel, there exists a region where a sensor does not exist or a physical barrier.

SUMMARY OF THE INVENTION

However, in the state where the region where a sensor does not exist or the physical barrier exists as described above, it has been difficult to drag and drop an object from one screen to the other screen. Then, both screens are each designed as isolated space, and it has been difficult to effectively utilize both screens to an extent that corresponds to a screen area obtained by adding the areas of both screens.

The present invention has been made in view of the above issues and it is desirable to provide a novel and improved technology capable of, in an information processing apparatus having two screens each formed of a touch panel, easily performing an interaction between the two screens.

According to an embodiment of the present invention, there is provided an information processing apparatus including a first touch panel having a first contact surface which can come into contact with an operating body and capable of acquiring first contact coordinate information indicating a contact position on the first contact surface with the operating body and also having a first display surface and capable of displaying information in the first display surface, a second touch panel having a second contact surface which can come into contact with the operating body and capable of acquiring second contact coordinate information indicating a contact position on the second contact surface with the operating body and also having a second display surface and capable of displaying information in the second display surface, a storage section which stores object data specifying an object and object coordinate information indicating a position of the object on the first display surface, and a control section which causes the object specified by the object data, which is stored in the storage section, to be displayed as a first object at a position indicated by the object coordinate information, when the first touch panel acquires the first contact coordinate information, determines whether the first object is selected by the operating body based on the first contact coordinate information and the object coordinate information, if it is determined that the first object is selected by the operating body, causes a second object, which is obtained by duplicating a part or all of the first object, to be displayed at a predetermined position on the second display surface, when the second touch panel acquires the second contact coordinate information, determines whether the second object is selected by the operating body based on the second contact coordinate information and in-second display surface destination coordinate information which indicates the predetermined position, and if it is determined that the second object is selected by the operating body, hides the first object displayed at the position indicated by the object coordinate information and also updates the object coordinate information with the in-second display surface destination coordinate information.

The control section may acquire movement information indicating a direction and a distance in which the operating body moves on the first contact surface while being in contact therewith, may decide in-first display surface destination coordinate information, which is a destination of the first object within the first display surface, based on the movement information, may update the object coordinate information with the in-first display surface destination coordinate information and may also move the first object to a position indicated by the object coordinate information after being updated, may determine, based on the object coordinate information after being updated and coordinate information within a predetermined region on the first display surface, whether the first object has entered the predetermined region, and, if it is determined that the first object has entered the predetermined region, may determine that the first object is selected by the operating body and may cause the second object to be displayed at the predetermined position.

The storage section may store coordinate information of a predetermined point which forms the object and the control section may determine whether the coordinate information of the predetermined point corresponds to one of a plurality of pieces of coordinate information within the predetermined region, and, if the coordinate information of the predetermined point corresponds thereto, may determine that the first object has entered the predetermined region.

The storage section may store coordinate information of a predetermined point which forms the object and may also store information on shape and size of the object as the object data, and the control section may calculate a ratio of an area of a region which forms the first object and corresponds to one of a plurality of pieces of coordinate information within the predetermined region to an entire area of the first object based on the coordinate information of the predetermined point and the information on the shape and the size of the object, may determine whether the calculated ratio exceeds a predetermined value, and, if it is determined that the ratio exceeds the predetermined value, may determine that the first object has entered the predetermined region.

The storage section may store coordinate information of a predetermined point which forms the object and may also store information on shape and size of the object as the object data, and the control section may calculate a ratio of an area of a region which forms the first object and is not displayed in the first display surface to an entire area of the first object based on the coordinate information of the predetermined point and the information on the shape and the size of the object, may determine whether the calculated ratio exceeds a predetermined value, and, if it is determined that the ratio exceeds the predetermined value, may determine that the first object is selected by the operating body and may cause the second object to be displayed at the predetermined position.

When the second touch panel acquires the second contact coordinate information and also the first touch panel acquires the first contact coordinate information, the control section may determine whether the second object is selected by the operating body based on the second contact coordinate information and in-second display surface destination coordinate information which indicates the predetermined position and may also determine whether the first object is selected by the operating body based on the first contact coordinate information and the object coordinate information, if it is determined that the first object and the second object are selected, may omit processing to hide the first object displayed at a position indicated by the object coordinate information, and may register the in-second display surface destination coordinate information as new object coordinate information other than the object coordinate information without updating the object coordinate information.

When the first touch panel acquires the first contact coordinate information in a state in which the second object is displayed at the predetermined position, the control section may determine whether the first object is selected by the operating body based on the first contact coordinate information and the object coordinate information, if it is determined that the first object is selected, may omit processing to hide the object displayed at a position indicated by the object coordinate information, and may hide the second object displayed at the predetermined position without updating the object coordinate information.

If the control section acquires movement information indicating a direction and a distance in which the operating body moves on the first contact surface while being in contact therewith in a state in which the second object is displayed at the predetermined position, the control section may cause the second object to move within the second display surface based on the movement information.

If it is determined that the second object is not selected by the operating body for a predetermined time from a start of a display of the second object, the control section may hide the second object displayed at the predetermined position.

The control section may cause the second object to be displayed at the predetermined position at a luminance lower than a luminance of the first object displayed at the position indicated by the object coordinate information, or in a translucent or blinking manner.

The information processing apparatus may further include a third touch panel having a third contact surface which can come into contact with an operating body and capable of acquiring third contact coordinate information indicating a contact position on the third contact surface with the operating body and also having a third display surface and capable of displaying information in the third display surface. The control section may cause a third object, which is further obtained by duplicating a part or all of the first object, to be displayed at a predetermined position on the third display surface if it is determined that the first object is selected by the operating body, may further hide the third object displayed at the predetermined position on the third display surface if it is determined that the second object is selected by the operating body, and may hide the first object displayed at the position indicated by the object coordinate information and the second object at the predetermined position on the second display surface and may also update the object coordinate information with in-third display surface destination coordinate information, which indicates a predetermined position on the third display surface, if it is determined that the third object is selected by the operating body.

The control section may acquire movement information indicating a direction and a distance in which the operating body moves on the first contact surface while being in contact therewith, may decide in-first display surface destination coordinate information, which is a destination of the first object within the first display surface, based on the movement information, may update the object coordinate information with the in-first display surface destination coordinate information and may also move the first object to a position indicated by the object coordinate information after being updated, may determine, based on the object coordinate information after being updated and coordinate information within a predetermined region on the first display surface, whether the first object has entered the predetermined region, and, if it is determined that the first object has entered the predetermined region, may determine that the first object is selected by the operating body and may cause the second object to be displayed at the predetermined position on the second display surface and may also cause the third object to be displayed at the predetermined position on the third display surface.

The control section may acquire movement information indicating a direction and a distance in which the operating body moves on the first contact surface while being in contact therewith, may decide in-first display surface destination coordinate information, which is a destination of the first object within the first display surface, based on the movement information, may update the object coordinate information with the in-first display surface destination coordinate information and may also move the first object to a position indicated by the object coordinate information after being updated, may determine, based on the object coordinate information after being updated, coordinate information within a second predetermined region on the first display surface, and coordinate information within a third predetermined region on the first display surface, whether the first object has entered the second predetermined region or the third predetermined region, and, if it is determined that the first object has entered the second predetermined region, may determine that the first object is selected by the operating body and may cause the second object to be displayed at the predetermined position on the second display surface and if it is determined that the first object has entered the third predetermined region, may determine that the first object is selected by the operating body and may cause the third object to be displayed at the predetermined position on the third display surface.

The information processing apparatus may further include a communication section capable of communicating with another device. The storage section may further store a first file including predetermined data, and if it is determined that the second object is selected by the operating body, the control section may further cause the communication section to perform processing to transmit the first file to the another device and may delete the first file from the storage section.

The information processing apparatus may further include a communication section capable of communicating with another device. The storage section may further store a first file including predetermined data, and if it is determined that the first object and the second object are selected, the control section may further cause the communication section to perform processing to transmit a second file, which is obtained by duplicating the first file, to the another device and may leave the first file in the storage section.

According to the embodiments of the present invention described above, in an information processing apparatus having two screens each formed of a touch panel, the interaction between the two screens can be easily performed.

BRIEF DESCRIPTION OF THE DRAWINGS

FIG. 4 is a diagram showing a configuration example of object management information stored in a storage section;

DETAILED DESCRIPTION OF THE EMBODIMENTS

Figure 1:
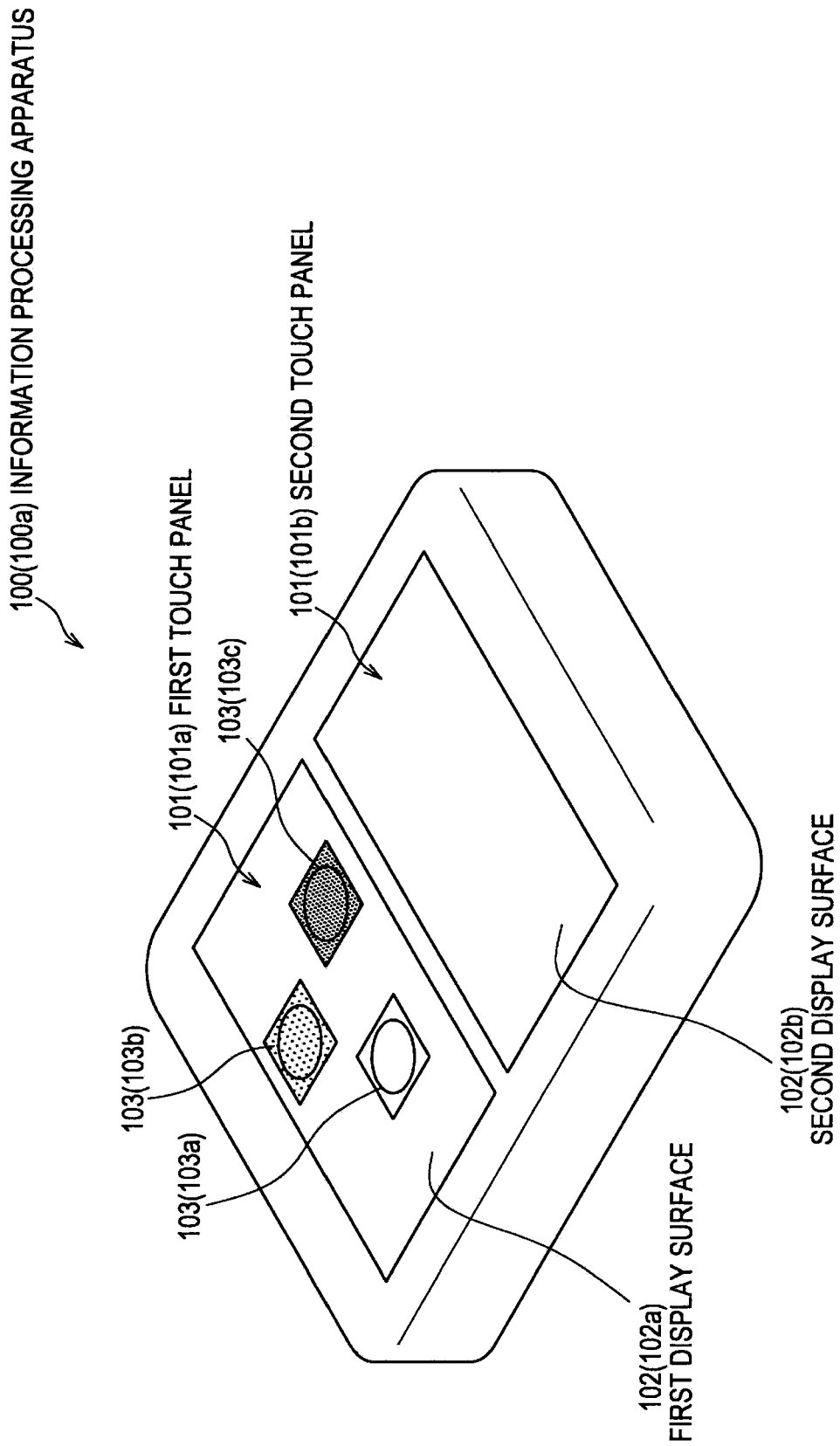
FIG. 1 is a diagram showing a schematic configuration example of an information processing apparatus according to a first embodiment of the present invention.

Hereinafter, preferred embodiments of the present invention will be described in detail with reference to the appended drawings. Note that, in this specification and the appended drawings, structural elements which have substantially the same function and structure are denoted with the same reference numerals, and repeated explanation of these structural elements is omitted. Note that the description is provided in the order shown below.

1. First Embodiment 1-1. Schematic configuration example of information processing apparatus
1-2. Hardware configuration of information processing apparatus
1-3. Functional configuration of information processing apparatus (touch panel and storage section)
1-4. Configuration example of object management information
1-5. Functional configuration of information processing apparatus (control section)
1-6. Functional configuration of information processing apparatus (control section: leaving object to both display surfaces)
1-7. Functional configuration of information processing apparatus (control section: returning object to first display surface)
1-8. Functional configuration of information processing apparatus (control section: moving duplicate object)
1-9. Functional configuration of information processing apparatus (control section: deleting duplicate object after elapse of time)
1-10. Functional configuration of information processing apparatus (control section: display method of duplicate object)
1-11. Operation of information processing apparatus (control section)

2. Second Embodiment 2-1. Hardware configuration of information processing apparatus
2-2. Functional configuration of information processing apparatus (touch panel and storage section)
2-3. Functional configuration of information processing apparatus (control section)

3. Third Embodiment 3-1. Hardware configuration of information processing apparatus
3-2. Functional configuration of information processing apparatus (touch panel and storage section, communication unit)
3-3. Functional configuration of information processing apparatus (control section)

4. Modified Examples of Embodiments of the Present Invention

5. Summary

1. First Embodiment

First, the first embodiment of the present invention will be described.

[1-1. Schematic Configuration Example of Information Processing Apparatus]

FIG. 1 is a diagram showing a schematic configuration example of an information processing apparatus according to the first embodiment of the present invention. In the first embodiment of the present invention, a description will be made on an information processing apparatus 100 (100a) including two touch panels 101 (a first touch panel 101a and a second touch panel 101b). The first touch panel 101a has a first display surface 102a, and the second touch panel 101b has a second display surface 102b. An object 103 is displayed in at least one of the two display surfaces 102. In the example shown in FIG. 1, the objects 103 (103a, 103b, and 103c) are displayed in the first display surface 102a, but the number of the object 103 is not particularly limited and may be any as long as it is 1 or more. Further, the kind of the two touch panels 101 (first touch panel 101a and second touch panel 101b) is not particularly limited.

Hereinafter, the case where the object 103b is moved from the first display surface 102a to the second display surface 102b will be described, and when the object 103, which is to be moved, is the object 103a, the object 103c, another object, or the like, the object 103 can be moved similarly. Further, it is also possible to move the objects 103 (103a, 103b, and 103c) and another object from the second display surface 102b to the first display surface 102a in the same manner as in the case where the object 103b is moved from the first display surface 102a to the second display surface 102b.

[1-2. Hardware Configuration of Information Processing Apparatus]

Figure 2:
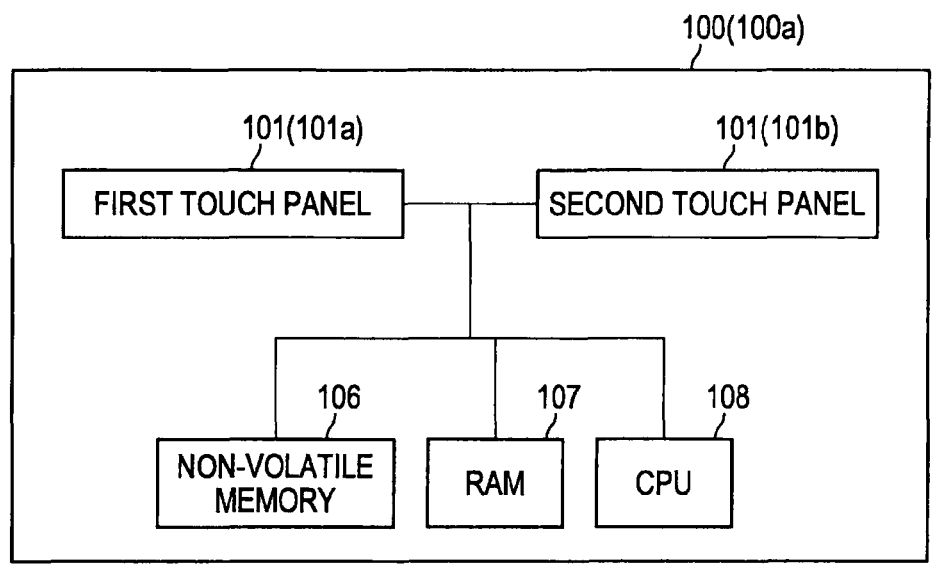
FIG. 2 is a block diagram showing a hardware configuration of the information processing apparatus according to the first embodiment of the present invention.

FIG. 2 is a block diagram showing a hardware configuration of the information processing apparatus according to the first embodiment of the present invention. As shown in FIG. 2, the information processing apparatus 100a according to the first embodiment of the present invention includes the first touch panel 101a, the second touch panel 101b, a non-volatile memory 106, an RAM (Random Access Memory) 107, and a CPU (Central Processing Unit) 108.

The non-volatile memory 106 is a device for storing data, and includes, for example, a magnetic storage device such as an HDD (Hard Disk Drive), a semiconductor storage device, an optical storage device, or a magneto-optical storage device. The non-volatile memory 106 stores programs executed by the CPU 108 and various kinds of data.

The RAM 107 temporarily stores programs used by the CPU 108 and parameters which appropriately change during execution thereof.

The CPU 108 functions as an arithmetic processing unit and a control unit and controls the overall operation inside the information processing apparatus 100a or a portion thereof according to various programs recorded in the non-volatile memory 106 or the RAM 107.

In the foregoing, an example of the hardware configuration which can realize the function of the information processing apparatus 100a according to the first embodiment of the present invention has been shown. Each of the above components may be configured using general-purpose members or hardware specialized for the function of each component. Therefore, the hardware configuration to be used can be changed appropriately in accordance with the technical level each time when the first embodiment is carried out.

[1-3. Functional Configuration of Information Processing Apparatus (Touch Panel and Storage Section)]

Figure 3:
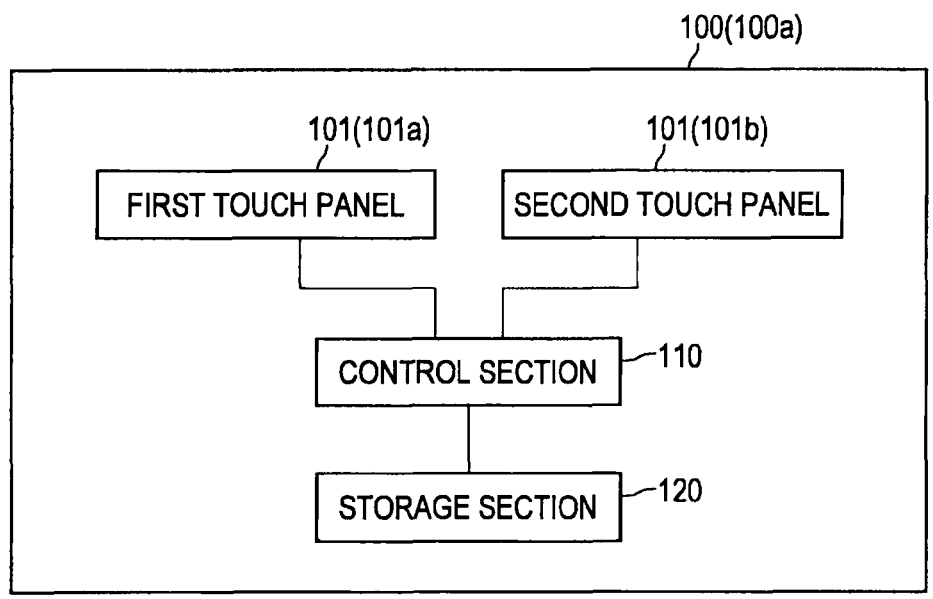
FIG. 3 is a block diagram showing a functional configuration of the information processing apparatus according to the first embodiment of the present invention.

FIG. 3 is a block diagram showing a functional configuration of the information processing apparatus according to the first embodiment of the present invention. As shown in FIG. 3, the information processing apparatus 100a includes the first touch panel 101a, the second touch panel 101b, a control section 110, and a storage section 120.

The first touch panel 101a has a first contact surface which can come into contact with an operating body and is capable of acquiring first contact coordinate information indicating a contact position on the first contact surface with the operating body. Further, the first touch panel 101a has the first display surface 102a and is capable of displaying information in the first display surface 102a. It can be assumed that the operating body is, for example, the finger of a user or a pen which operates the information processing apparatus 100a.

The second touch panel 101b has a second contact surface which can come into contact with the operating body and is capable of acquiring second contact coordinate information indicating a contact position on the second contact surface with the operating body. Further, the second touch panel 101b has the second display surface 102b and is capable of displaying information in the second display surface 102b.

The storage section 120 includes, for example, the non-volatile memory 106 and stores object data and object coordinate information. The object data specifies the object 103 and includes, for example, parameters which specify properties of the object 103, such as shape, size, and color of the object 103. In the example shown in FIG. 1, the shape of the object 103 is square. Accordingly, there may be exemplified, as the object data specifying the object 103, parameters of width 10 and height 10.

The object coordinate information (may be simply referred to as "coordinate information") indicates the position of the object 103 on the display surface 102. The object coordinate information includes, for example, a combination of display surface-identification information for identifying the first display surface 102a or the second display surface 102b and coordinate information within each of the display surfaces 102. The coordinate information is not particularly limited, and may be any as long as it can uniquely specify the position within each of the display surfaces 102. The object coordinate information indicating the position (x, y)=(20, 30) of the first display surface 102a can be expressed, for example, in the form of (display surface-identification information, x, y)=(1, 20, 30). Further, for example, as long as the xy coordinates can be uniquely specified on the display surface including the first display surface 102a and the second display surface 102b, the display surface-identification information is not necessarily included in the object coordinate information.

[1-4. Configuration Example of Object Management Information]

FIG. 4 is a diagram showing a configuration example of object management information stored in a storage section. As shown in FIG. 4, the object management information includes, for example, the object identification information for identifying object data, the above-mentioned coordinate information, width, height, type, and the like. For the type, a value such as "entity" or "duplicate" can be set: "entity" means that it is decided that the object is present at the displayed position; and "duplicate" means that it is not decided that the object is moved to the displayed position.

[1-5. Functional Configuration of Information Processing Apparatus (Control Section)]

Figure 5:
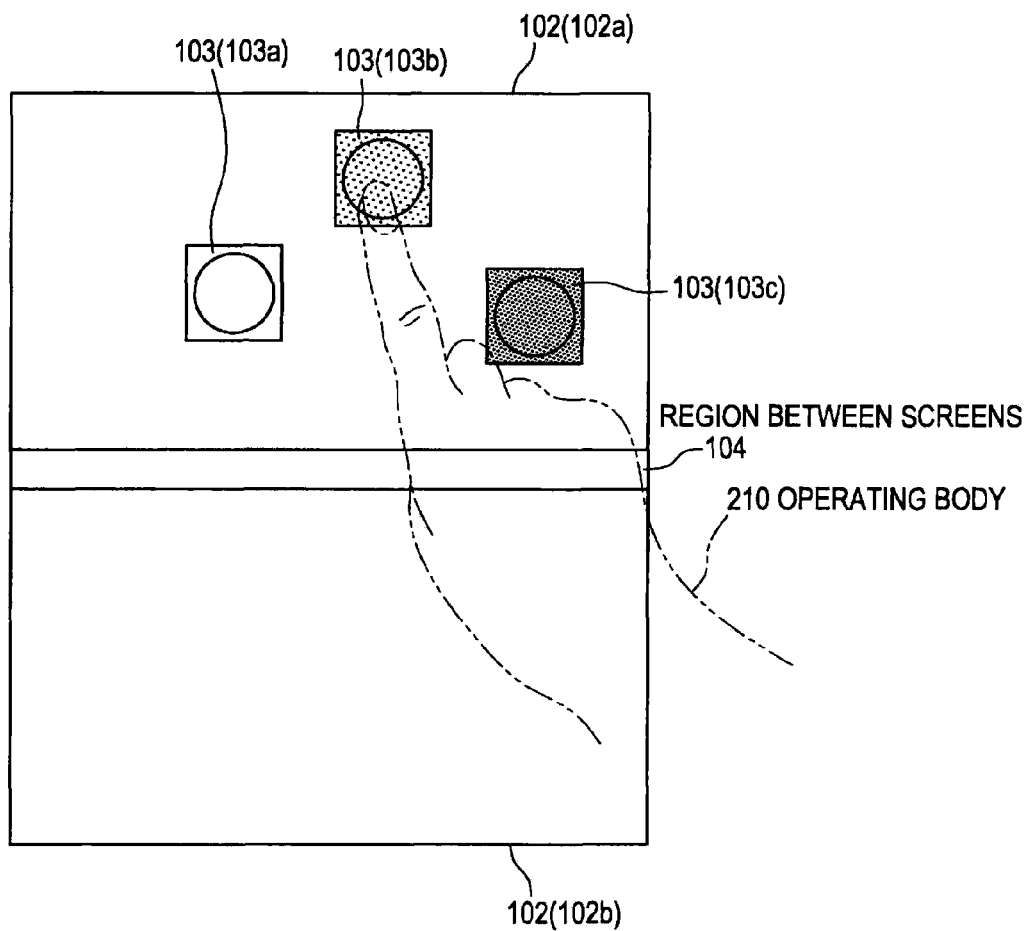
FIG. 5 is a diagram showing a state before an object is moved from one touch panel to the other touch panel.
Figure 6:
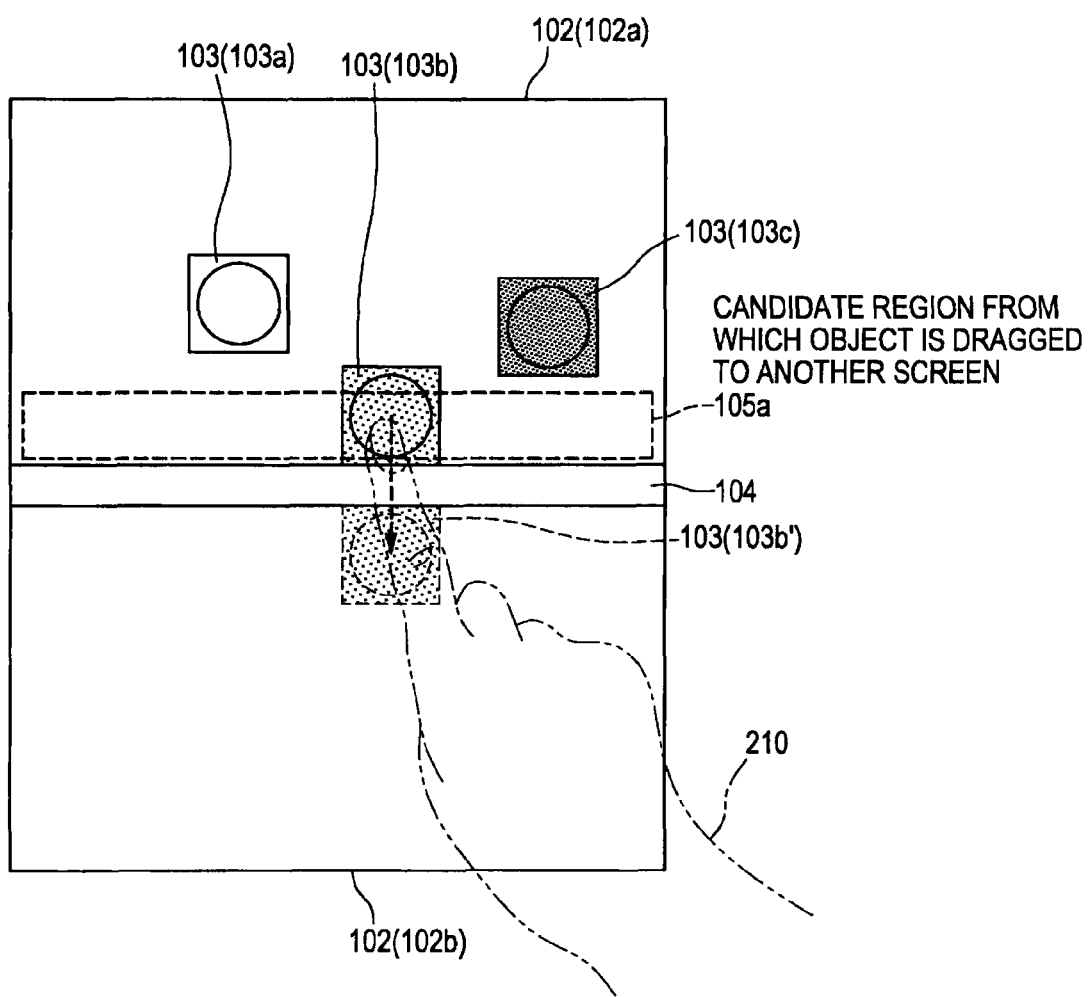
FIG. 6 is a diagram showing a state where the object is being moved from one touch panel to the other touch panel.
Figure 7:
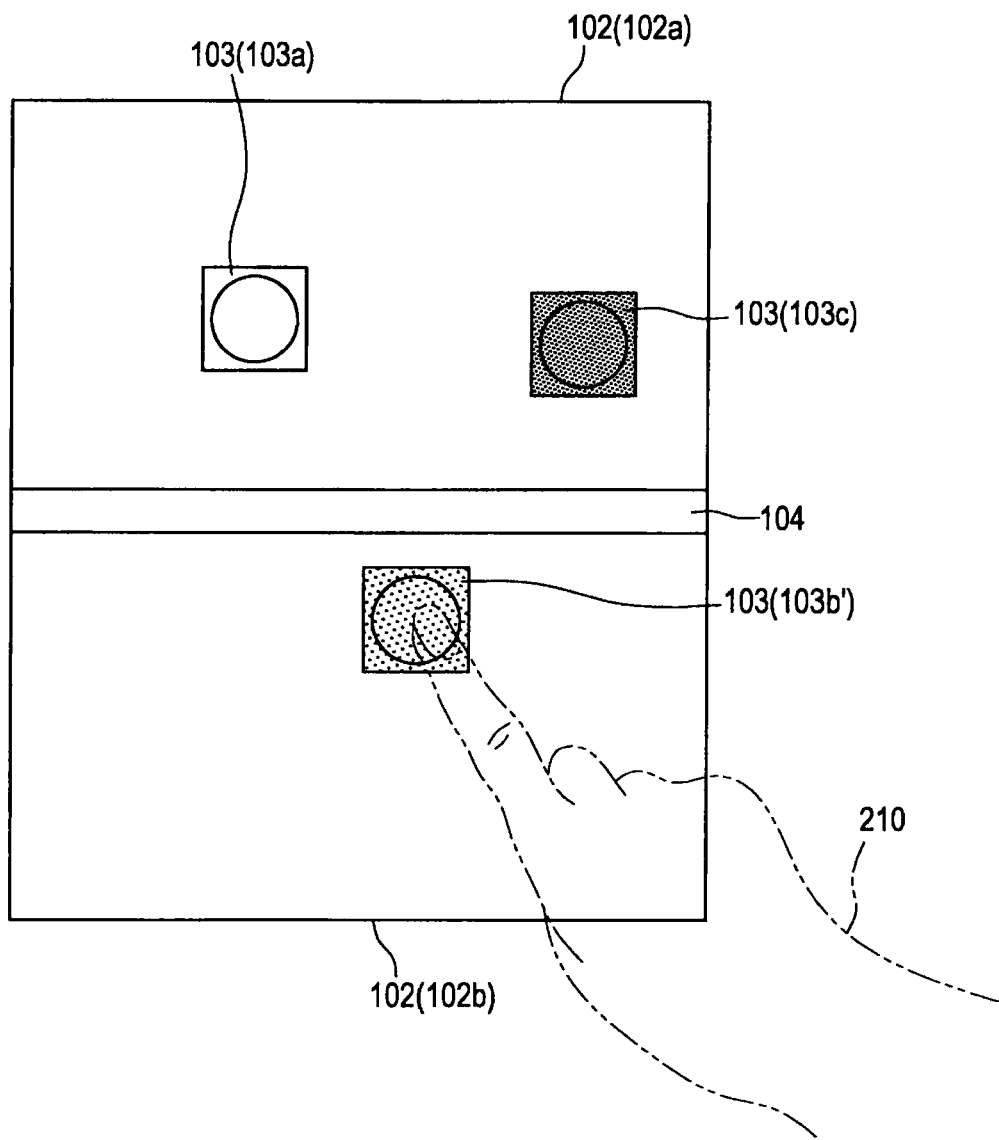
FIG. 7 is a diagram showing a state after the object is moved from one touch panel to the other touch panel.

FIG. 5 is a diagram showing a state before an object is moved from one touch panel to the other touch panel. FIG. 6 is a diagram showing a state where the object is being moved from one touch panel to the other touch panel. FIG. 7 is a diagram showing a state after the object is moved from one touch panel to the other touch panel.

The control section 110 includes, for example, the RAM 107 and the CPU 108 and causes the object specified by the object data, which is stored in the storage section 120, to be displayed as the object 103b (first object) at a position indicated by the object coordinate information stored in the storage section 120. When the first touch panel 101a acquires the first contact coordinate information, the control section 110 determines whether the object 103b is selected by an operating body 210 based on the first contact coordinate information and the object coordinate information stored in the storage section 120. For example, the control section 110 determines that the object 103b is selected by the operating body 210 when there is overlapping coordinate information between the first contact coordinate information and the object coordinate information stored in the storage section 120.

When it is determined that the object 103b is selected by the operating body 210, the control section 110 causes an object 103b' (second object), which is obtained by duplicating a part or all of the object 103b, to be displayed at a predetermined position on the second display surface 102b, and when the second touch panel 101b acquires the second contact coordinate information, the control section 110 determines whether the object 103b' is selected by the operating body 210 based on the second contact coordinate information and in-second display surface destination coordinate information which indicates the predetermined position. For example, the control section 110 determines that the object 103b' is selected by the operating body 210 when there is overlapping coordinate information between the second contact coordinate information and the predetermined position.

In the example shown in FIG. 6, the control section 110 calculates the position which is the nearest to the object 103b on the second display surface 102b, uses the calculated position as the predetermined position on the second display surface 102b, and causes the object 103b' to be displayed at the predetermined position. However, the predetermined position on the second display surface 102b may also be a position which is fixedly decided on the second display surface 102b. The position which is fixedly decided may be the center or the edge of the second display surface 102b, and is not particularly limited.

If it is determined that the object 103b' is selected by the operating body 210, the control section 110 hides the object 103b displayed at the position indicated by the object coordinate information and also updates the object coordinate information with the in-second display surface destination coordinate information. In the example shown in FIG. 7, the object 103b is hidden.

When the operating body 210 performs drag operation of the object 103b on the first display surface 102a, the control section 110 acquires movement information indicating a direction and a distance in which the operating body 210 moves on the first contact surface while being in contact therewith. The control section 110 decides in-first display surface destination coordinate information (coordinate information which indicates the position of the object 103b shown in FIG. 6), which is a destination of the object 103b within the first display surface 102a, based on the acquired movement information. For example, the control section 110 moves the object 103b in the same direction as that indicated by the movement information and the same distance as that indicated by the movement information.

There are various methods for determining that the object 103b' is selected by the operating body 210. For example, there are a method of setting a candidate region 105a from which the object is dragged to another screen as a predetermined region on the first display surface 102a (see FIG. 6) and a method of not setting the candidate region 105a from which the object is dragged to another screen.

First, the case of setting the candidate region 105a from which the object is dragged to another screen will be described. In the example shown in FIG. 6, the shape of the candidate region 105a from which the object is dragged to another screen is rectangular, but is not particularly limited and may be of any shape. Further, in the example shown in FIG. 6, the candidate region 105a from which the object is dragged to another screen is present at a position which is near to the second display surface 102b in the region within the first display surface 102a, but may be present at any position. The control section 110 updates the object coordinate information stored in the storage section 120 with the in-first display surface destination coordinate information and also moves the object 103b to a position indicated by the object coordinate information after being updated. The control section 110 determines, based on the object coordinate information after being updated and coordinate information within the candidate region 105a from which the object is dragged to another screen, whether the object 103b has entered the candidate region 105a from which the object is dragged to another screen.

There are also various methods for determining whether the object 103b has entered the candidate region 105a from which the object is dragged to another screen. For example, the storage section 120 may store coordinate information of a predetermined point which forms the object as object coordinate information. In that case, the control section 110 determines whether the coordinate information of the predetermined point corresponds to one of a plurality of pieces of coordinate information within the candidate region 105a from which the object is dragged to another screen, and, if the coordinate information of the predetermined point corresponds thereto, determines that the object 103 has entered the candidate region 105a from which the object is dragged to another screen. The predetermined point may be any point as long as it is the point which forms the object, and may be, for example, the center of the object or, in the case where the object is a polygon, one of the vertices which form the polygon.

Further, for example, the storage section 120 may store coordinate information of a predetermined point which forms the object and may also store information on shape and size of the object as the object data. In that case, the control section 110 calculates a ratio of an area of a region which forms the object 103b and corresponds to one of a plurality of pieces of coordinate information within the candidate region 105a from which the object is dragged to another screen to an entire area of the object 103b, based on the coordinate information of the predetermined point and the information on the shape and the size of the object. The control section 110 determines whether the calculated ratio exceeds a predetermined value, and, if it is determined that the ratio exceeds the predetermined value, determines that the object 103b has entered the candidate region 105a from which the object is dragged to another screen. The predetermined value used herein may be stored in, for example, the storage section 120.

Subsequently, the case of not setting the candidate region 105a from which the object is dragged to another screen will be described. Also in this case, the storage section 120 stores coordinate information of a predetermined point which forms the object and also store information on shape and size of the object as the object data. The control section 110 calculates a ratio of an area of a region which forms the object 103b and is not displayed in the first display surface 102a to an entire area of the object 103b, based on the coordinate information of the predetermined point and the information on the shape and the size of the object. The control section 110 determines whether the calculated ratio exceeds a predetermined value, and, if it is determined that the ratio exceeds the predetermined value, determines that the object 103b is selected by the operating body 210.

The description of the methods for determining that the object 103b' is selected by the operating body 210 is finished. If it is determined that the object 103b has entered the predetermined region, the control section 110 determines that the object 103b is selected by the operating body 210 and causes the object 103b' to be displayed at the predetermined position on the second display surface 102b.

[1-6. Functional Configuration of Information Processing Apparatus (Control Section: Leaving Object to both Display Surfaces)]

Figure 8:
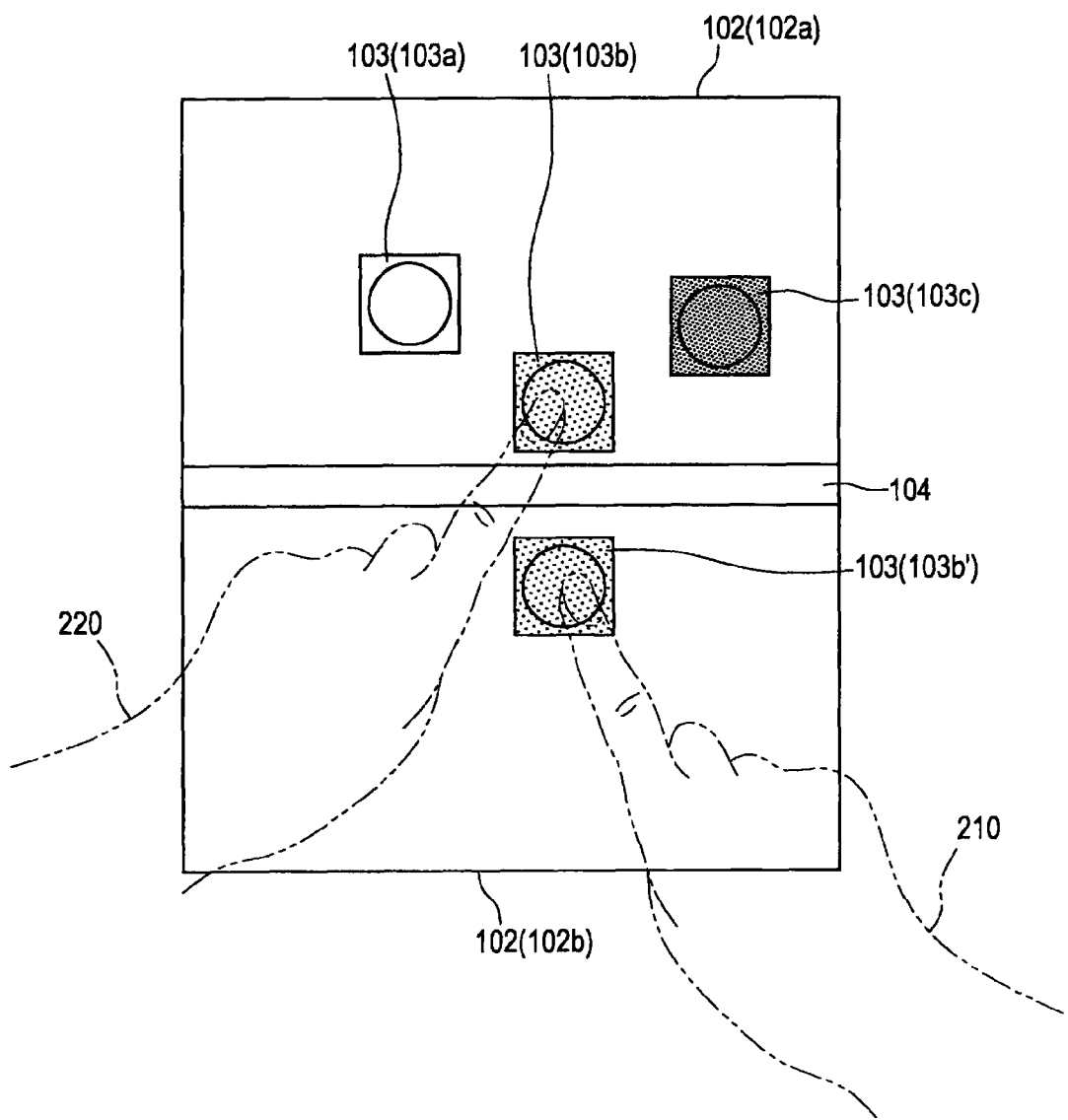
FIG. 8 is a diagram showing a state where the object is left on both touch panels.

FIG. 8 is a diagram showing a state where the object is left on both touch panels. When the second touch panel 101b acquires the second contact coordinate information and also the first touch panel 101a acquires the first contact coordinate information, the control section 110 determines whether the object 103b' is selected by the operating body 210 based on the second contact coordinate information and in-second display surface destination coordinate information which indicates the predetermined position on the second display surface 102b. At the same time, the control section 110 determines whether the object 103b is selected by the operating body 220 based on the first contact coordinate information and the object coordinate information stored in the storage section 120.

If it is determined that the object 103b and the object 103b' are selected, the control section 110 omits processing to hide the object 103b displayed at a position indicated by the object coordinate information stored in the storage section 120. Then, the control section 110 registers the in-second display surface destination coordinate information as new object coordinate information other than the object coordinate information stored in the storage section 120 without updating the object coordinate information stored in the storage section 120. That is, the coordinate information of the object 103b and the coordinate information of the object 103b' are stored in the storage section 120.

[1-7. Functional Configuration of Information Processing Apparatus (Control Section: Returning Object to First Display Surface)]

It is also possible for a user to perform consciously operations of hiding the object 103b' displayed in the second display surface 102b and leaving the object 103b displayed in the first display surface 102a to the first display surface 102a. In this case, when the first touch panel 101a acquires the first contact coordinate information in a state in which the object 103b' is displayed at the predetermined position in the second display surface 102b, the control section 110 determines whether the object 103b is selected by the operating body 210 based on the first contact coordinate information and the object coordinate information stored in the storage section 120. If it is determined that the object 103b is selected, the control section 110 omits processing to hide the object displayed at a position indicated by the object coordinate information stored in the storage section 120. Then, the control section 110 hides the object 103b' displayed at the predetermined position on the second display surface 102b without updating the object coordinate information stored in the storage section 120.

[1-8. Functional Configuration of Information Processing Apparatus (Control Section: Moving Duplicate Object)]

Figure 9:
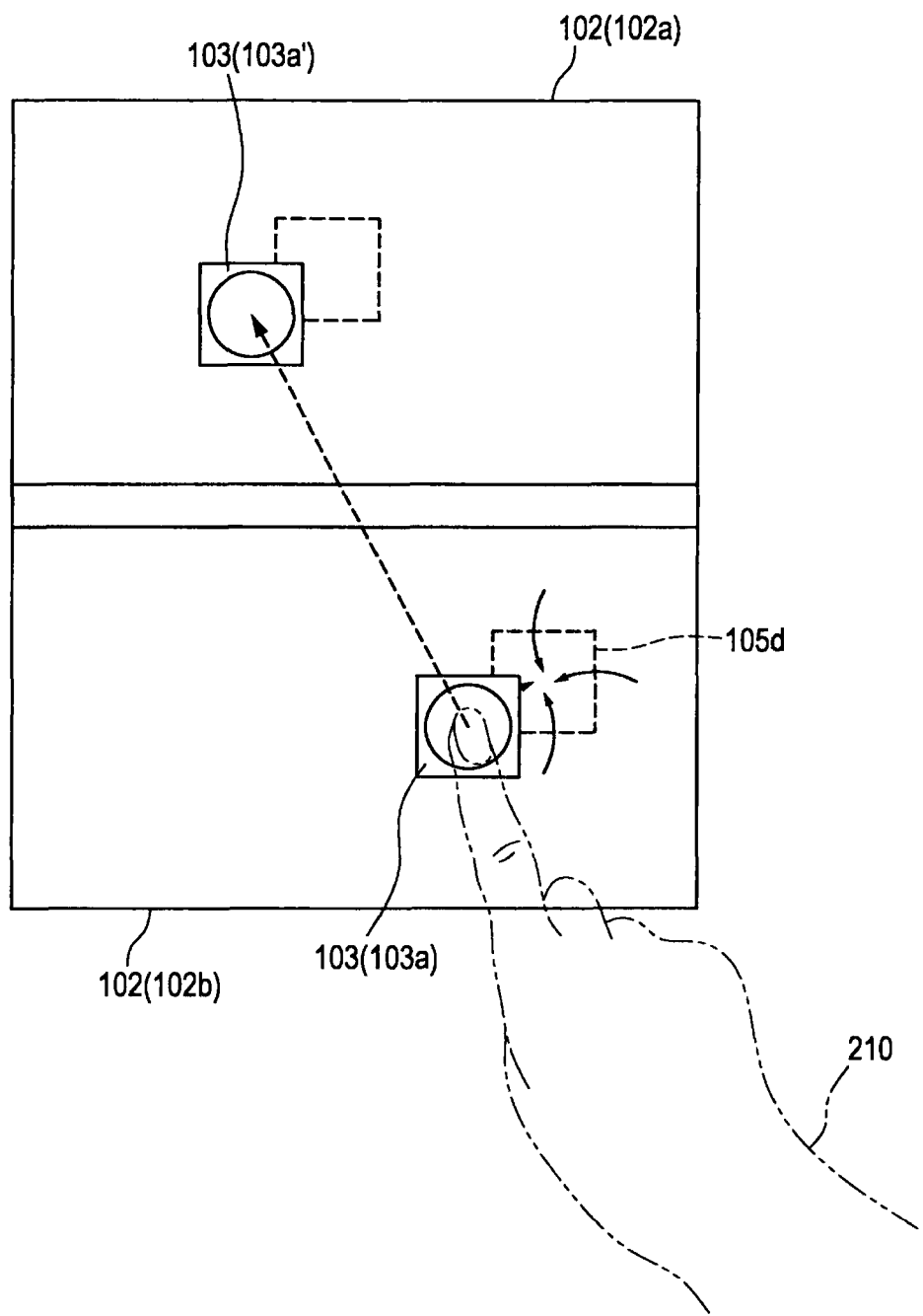
FIG. 9 is a diagram showing a state where a second object (duplicate object) is being moved in conjunction with a first object (entity object)

FIG. 9 is a diagram showing a state where a second object (duplicate object) is being moved in conjunction with a first object (entity object). The control section 110 acquires movement information indicating a direction and a distance in which the operating body 210 moves on the first contact surface while being in contact therewith in a state in which the object 103b' is displayed at the predetermined position on the second display surface 102b. The control section 110 causes the object 103b' to move within the second display surface 102b based on the movement information. For example, the control section 110 can cause the object 103b' to move within the second display surface 102b in the same direction as that indicated by the movement information and the same distance as that indicated by the movement information. Thus, the second object (duplicate object) can be moved in conjunction with the first object (entity object).

Further, as shown in FIG. 9, in order that the user can easily understand the place where the candidate region 105a from which the object is dragged to another screen exists, the region may be explicitly displayed on the second display surface 102b.

[1-9. Functional Configuration of Information Processing Apparatus (Control Section: Deleting Duplicate Object after Elapse of Time)]

The control section 110 may determine whether the object 103b' is selected by the operating body 210 within a predetermined time from a start of a display of the object 103b' at the predetermined position on the second display surface 102b. In that case, if it is determined that the object 103b' is not selected by the operating body 210 for the predetermined time, the control section 110 hides the object 103b' displayed at the predetermined position on the second display surface 102b. For doing so, the control section 110 may have a function to measure the time from the start of the display of the object 103b' and may have a function to cause, in the case where the predetermined time elapses, an event to delete the object 103b' to occur. The predetermined time is not particularly limited. Further, a value of the predetermined time can be stored in the storage section 120. In addition, also in the case where it is detected that the object 103b is moved in a shaking manner by the operating body 210, the control section 110 may cause the event to occur in the same manner as in the case where the predetermined time elapses.

[1-10. Functional Configuration of Information Processing Apparatus (Control Section: Display Method of Duplicate Object)]

The control section 110 may cause the object 103b' to be displayed at the predetermined position on the second display surface 102b at a luminance lower than a luminance of the object 103b displayed at the position indicated by the object coordinate information stored in the storage section 120. Further, the control section 110 may also cause the object 103b' to be displayed at the predetermined position on the second display surface 102b in a translucent manner, or may also cause the object 103b' to be displayed at the predetermined position on the second display surface 102b in a blinking manner.

[1-11. Operation of Information Processing Apparatus (Control Section)]

Figure 10:
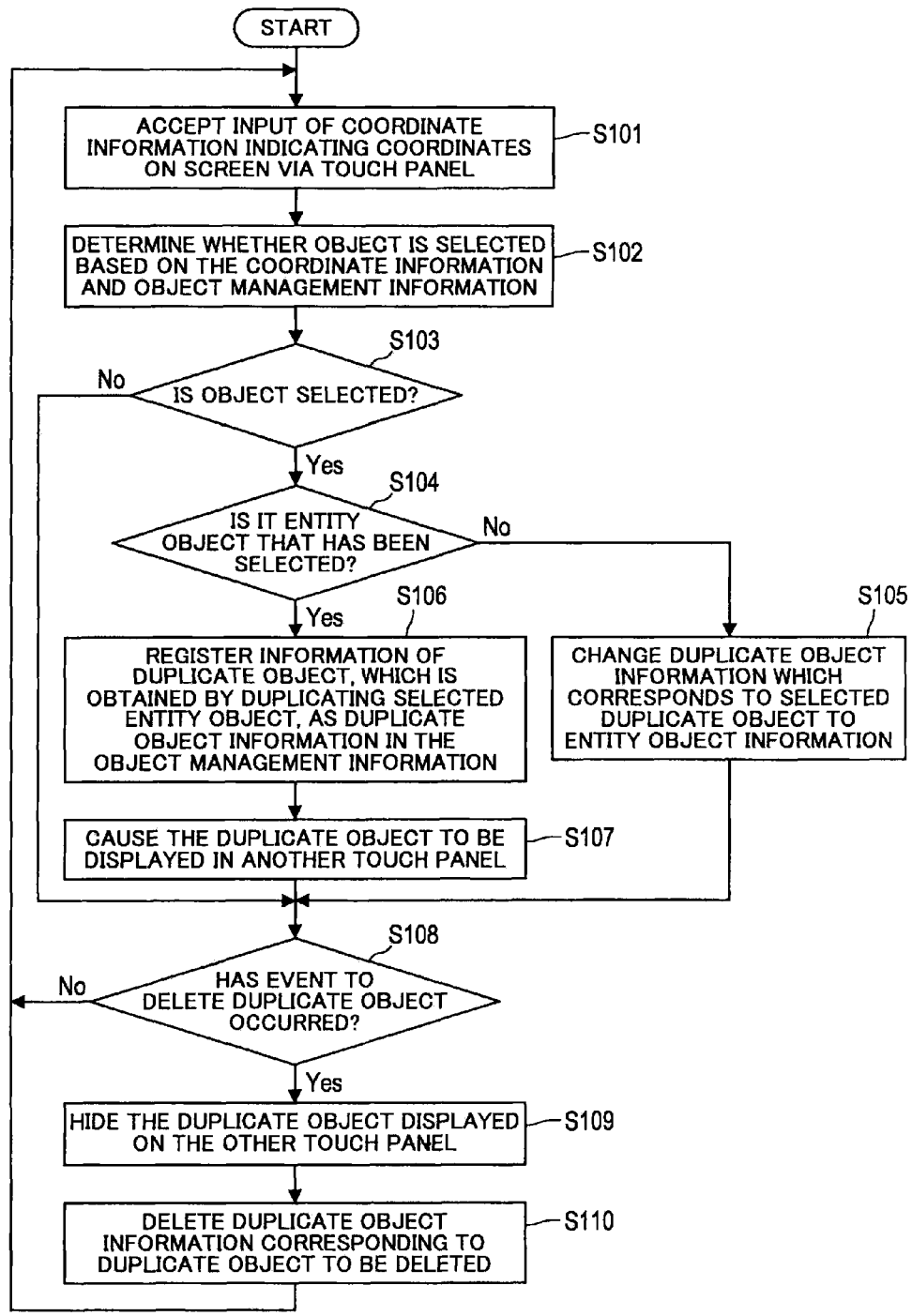
FIG. 10 is a flow chart showing an operation of the information processing apparatus according to the first embodiment of the present invention.

FIG. 10 is a flow chart showing an operation of the information processing apparatus according to the first embodiment of the present invention. As shown in FIG. 10, the control section 110 accepts an input of coordinate information indicating the coordinates on the screen via the touch panel 101 (step S101). Subsequently, the control section 110 determines whether the object is selected based on the coordinate information and object management information (step S102).

The control section 110 determines whether the object is selected (step S103). If the control section 110 determines that the object is not selected ("No" at step S103), the control section 110 proceeds to step S108. If the control section 110 determines that the object is selected ("Yes" at step S103), the control section 110 determines whether it is the entity object that has been selected (step S104).

If the control section 110 determines that it is not the entity object that has been selected (i.e., duplicate object) ("No" at step S104), the control section 110 changes duplicate object information which corresponds to the selected duplicate object to entity object information (step S105) and proceeds to step S108. The duplicate object information is, for example, the object management information in which "duplicate" is set for "type" shown in FIG. 4, and the entity object information is, for example, the object management information in which "entity" is set for "type" shown in FIG. 4.

If the control section 110 determines that it is the entity object that has been selected ("Yes" at step S104), the control section 110 registers the information of the duplicate object, which is obtained by duplicating the selected entity object, as duplicate object information in the object management information (step S106). Then, the control section 110 causes the duplicate object to be displayed in another touch panel 101 (step S107), and proceeds to step S108.

The control section 110 determines whether the event to delete the duplicate object has occurred (step S108). If the control section 110 determines that the event to delete the duplicate object has not occurred ("No" at step S108), the control section 110 returns to step S101 to continue the processing. If the control section 110 determines that the event to delete the duplicate object has occurred ("Yes" at step S108), the control section 110 hides the duplicate object displayed on the other touch panel 101 (step S109). Then, the control section 110 deletes the duplicate object information corresponding to the duplicate object to be deleted (step S110), and returns to step S101 to continue the processing.

2. Second Embodiment

Subsequently, the second embodiment of the present invention will be described.

[2-1. Hardware Configuration of Information Processing Apparatus]

Figure 11:
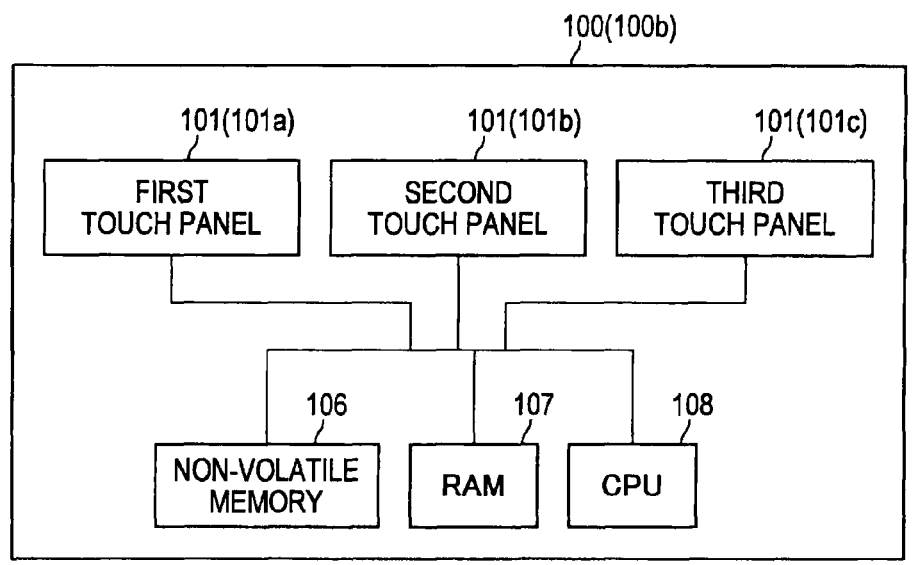
FIG. 11 is a block diagram showing a hardware configuration of an information processing apparatus according to a second embodiment of the present invention.

FIG. 11 is a block diagram showing a hardware configuration of an information processing apparatus according to the second embodiment of the present invention. As shown in FIG. 11, an information processing apparatus 100b according to the second embodiment of the present invention differs from the information processing apparatus 100a according to the first embodiment of the present invention in that the information processing apparatus 100b further includes a third touch panel 101c. The kind of the third touch panel 101c is also not particularly limited.

[2-2. Functional Configuration of Information Processing Apparatus (Touch Panel and Storage Section)]

Figure 12:
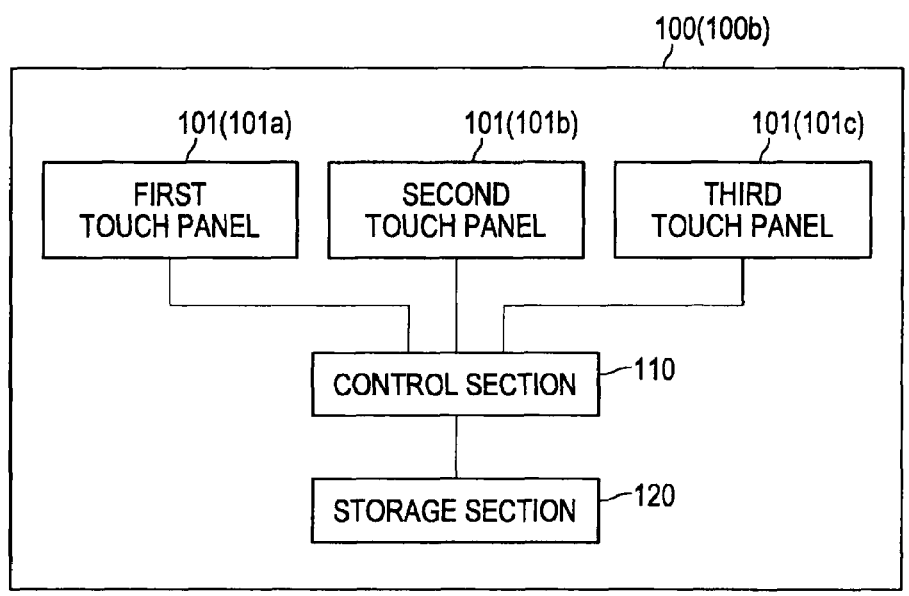
FIG. 12 is a block diagram showing a functional configuration of the information processing apparatus according to the second embodiment of the present invention.

FIG. 12 is a block diagram showing a functional configuration of the information processing apparatus according to the second embodiment of the present invention. As shown in FIG. 12, the information processing apparatus 100b differs from the information processing apparatus 100a according to the first embodiment of the present invention in that the information processing apparatus 100b further includes the third touch panel 101c.

The third touch panel 101c has a third contact surface which can come into contact with the operating body 210 and is capable of acquiring third contact coordinate information indicating a contact position on the third contact surface with the operating body. Further, the third touch panel 101c has a third display surface 102c and is capable of displaying information in the third display surface 102c. It can be assumed that the operating body is, for example, the finger of a user or a pen which operates the information processing apparatus 100b.

[2-3. Functional Configuration of Information Processing Apparatus (Control Section)]

Figure 13:
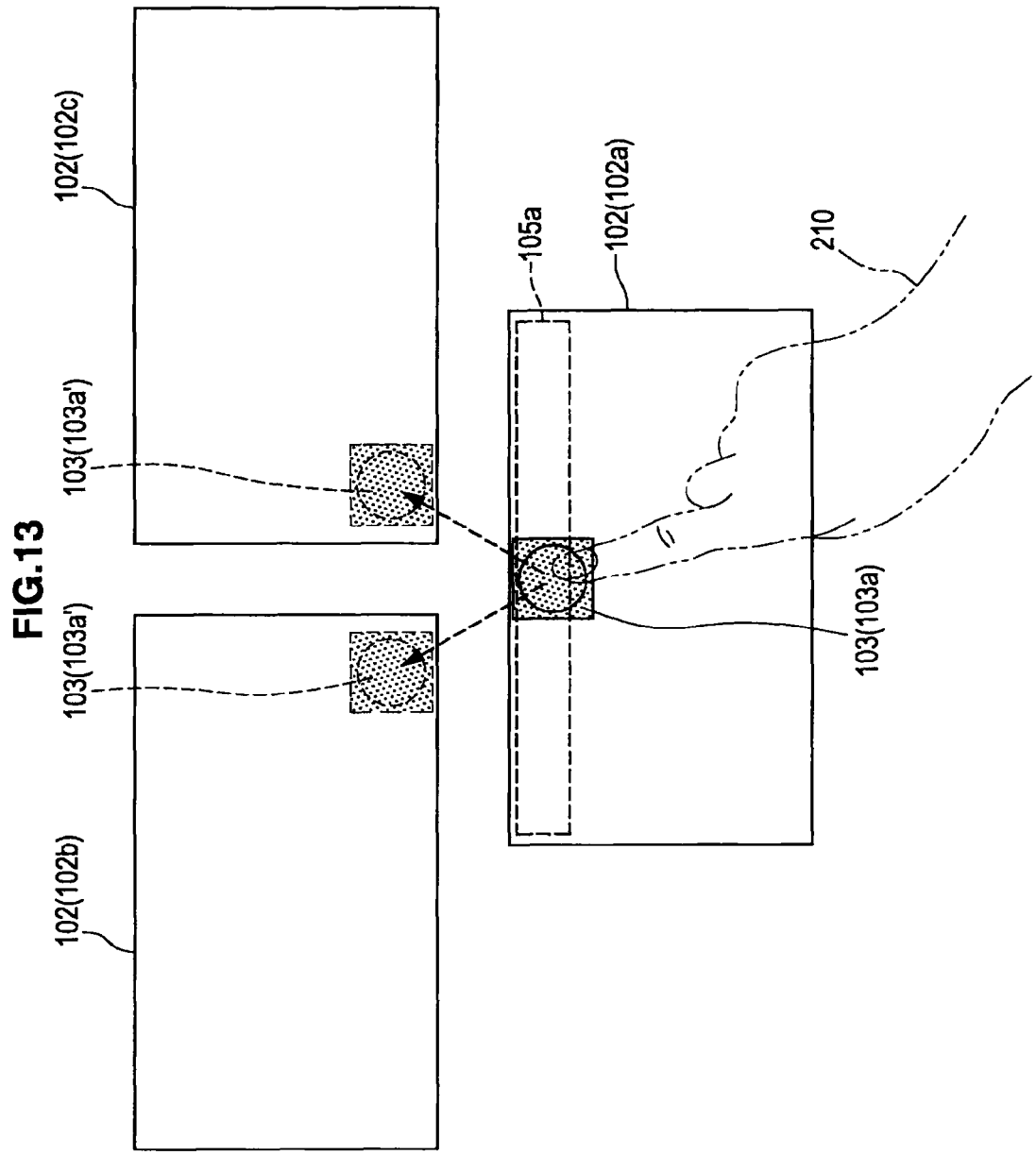
FIG. 13 is a diagram showing a state where an object is being moved to another screen in a case where the same candidate region from which the object is dragged to other screens is used for other destination panels.
Figure 14:
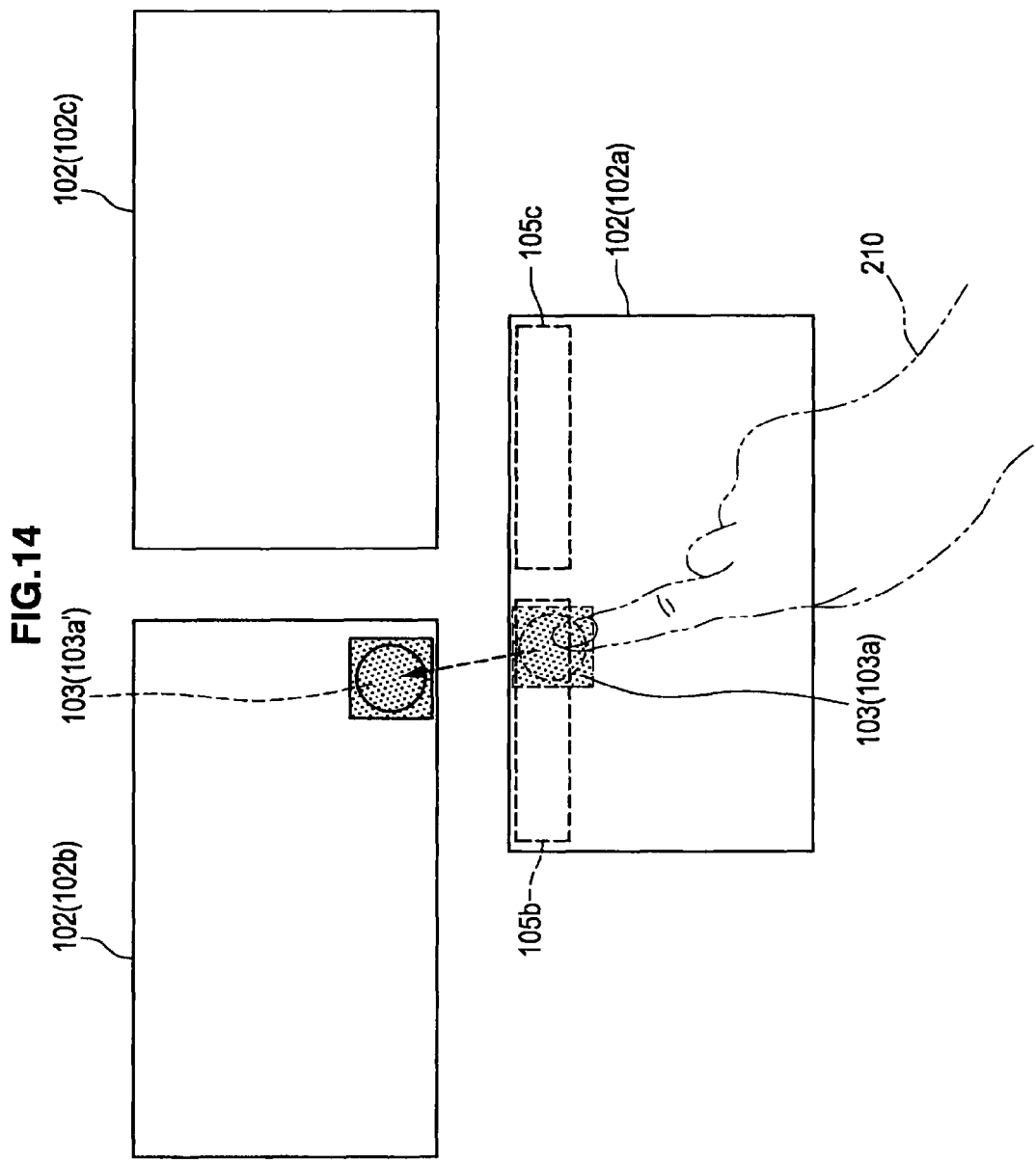
FIG. 14 a diagram showing a state where an object is being moved to another screen in a case where candidate regions from which the object is dragged to other screens are present for respective destination panels.

FIG. 13 is a diagram showing a state where an object is being moved to another screen in the case where the same candidate region from which the object is dragged to other screens is used for other destination panels. FIG. 14 a diagram showing a state where an object is being moved to another screen in the case where candidate regions from which the object is dragged to other screens are present for respective destination panels. In the second embodiment, a description will be made on the case where the object 103a is moved from the first display surface 102a to the second display surface 102b or to the third display surface 102c.

The control section 110 causes a object 103a', which is further obtained by duplicating a part or all of the object 103a, to be displayed at a predetermined position on the third display surface 102c if it is determined that the object 103a is selected by the operating body 210.

The control section 110 further hides the object 103a' displayed at the predetermined position on the third display surface 102c if it is determined that the object 103a' displayed at the predetermined position on the second display surface 102b is selected by the operating body 210.

The control section 110 may determine that the object 103a' displayed at the predetermined position on the third display surface 102c is selected by the operating body 210. In that case, the object 103a displayed at the position indicated by the object coordinate information stored in the storage section 120 and the object 103a' displayed at the predetermined position on the second display surface 102b are hidden. The control section 110 hides the object 103a' displayed at the predetermined position on the second display surface 102b and also updates the object coordinate information stored in the storage section 120 with in-third display surface destination coordinate information, which indicates a predetermined position on the third display surface 102c.

With reference to FIG. 13 (refer to other figures as appropriate), a description will be made on a method of moving the object to another screen in the case where the same candidate region from which the object is dragged to other screens is used for other destination panels. The control section 110 acquires movement information indicating a direction and a distance in which the operating body 210 moves on the first contact surface while being in contact therewith. The control section 110 decides in-first display surface destination coordinate information, which is a destination of the object 103a within the first display surface 102a, based on the acquired movement information, and updates the object coordinate information stored in the storage section 120 with the in-first display surface destination coordinate information. The control section 110 updates the object coordinate information and also moves the object 103a to the position indicated by the object coordinate information after being updated.

The control section 110 determines, based on the object coordinate information after being updated and coordinate information within the candidate region 105a from which the object is dragged to other screens on the first display surface 102a, whether the object 103a has entered the candidate region 105a from which the object is dragged to other screens. The control section 110 may determine that the object 103a has entered the candidate region 105a from which the object is dragged to other screens. In that case, the control section 110 determines that the object 103a is selected by the operating body 210, and causes the object 103a' to be displayed at the predetermined position on the second display surface 102b and also causes the object 103a' to be displayed at the predetermined position on the third display surface 102c.

With reference to FIG. 14 (refer to other figures as appropriate), a description will be made on a method of moving the object to another screen in the case where candidate regions from which the object is dragged to other screens are present for respective destination panels. In the same manner as in the case of moving the object in the case where the same candidate region from which the object is dragged to other screens is used for other destination panels, the control section 110 updates the object coordinate information stored in the storage section 120 with the in-first display surface destination coordinate information and moves the object 103a to the position indicated by the object coordinate information after being updated.

The control section 110 determines, based on the object coordinate information after being updated, coordinate information within the candidate region 105b from which the object is dragged to another screen on the first display surface 102a, and coordinate information within the candidate region 105c from which the object is dragged to another screen on the first display surface 102a, whether the object 103a has entered the candidate region 105b from which the object is dragged to another screen or the candidate region 105c from which the object is dragged to another screen. If it is determined that the object 103a has entered the candidate region 105b from which the object is dragged to another screen, the control section 110 determines that the object 103a is selected by the operating body 210 and causes the object 103a' to be displayed at the predetermined position on the second display surface 102b. If it is determined that the object 103a has entered the candidate region 105c from which the object is dragged to another screen, the control section 110 determines that the object 103a is selected by the operating body 210 and causes the object 103a' to be displayed at the predetermined position on the third display surface 102c.

3. Third Embodiment

Subsequently, the third embodiment of the present invention will be described.

[3-1. Hardware Configuration of Information Processing Apparatus]

Figure 15:
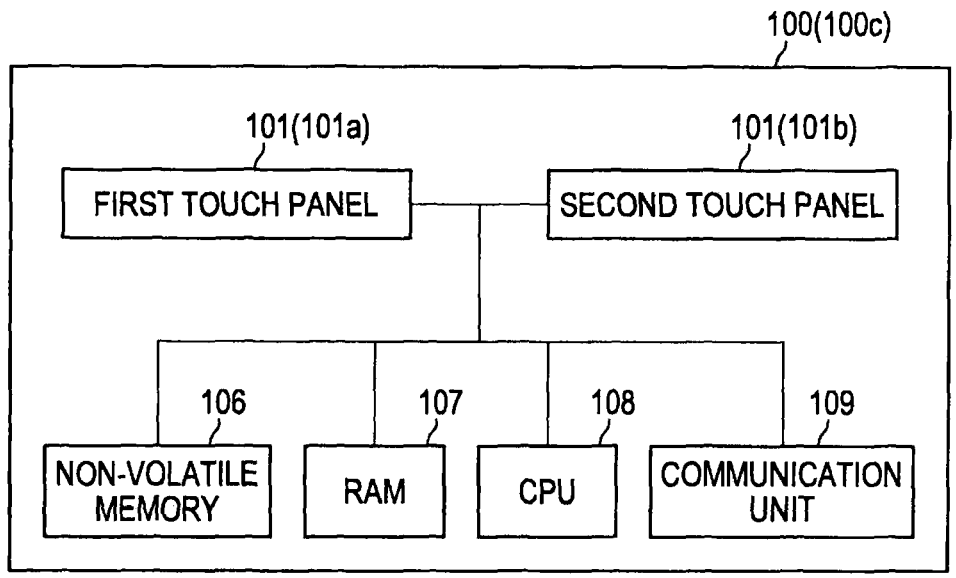
FIG. 15 is a block diagram showing a hardware configuration of an information processing apparatus according to a third embodiment of the present invention.

FIG. 15 is a block diagram showing a hardware configuration of an information processing apparatus according to the third embodiment of the present invention. As shown in FIG. 15, an information processing apparatus 100c according to the third embodiment of the present invention differs from the information processing apparatus 100a according to the first embodiment of the present invention in that the information processing apparatus 100c further includes a communication unit 109.

[3-2. Functional Configuration of Information Processing Apparatus (Touch Panel and Storage Section, Communication Unit)]

Figure 16:
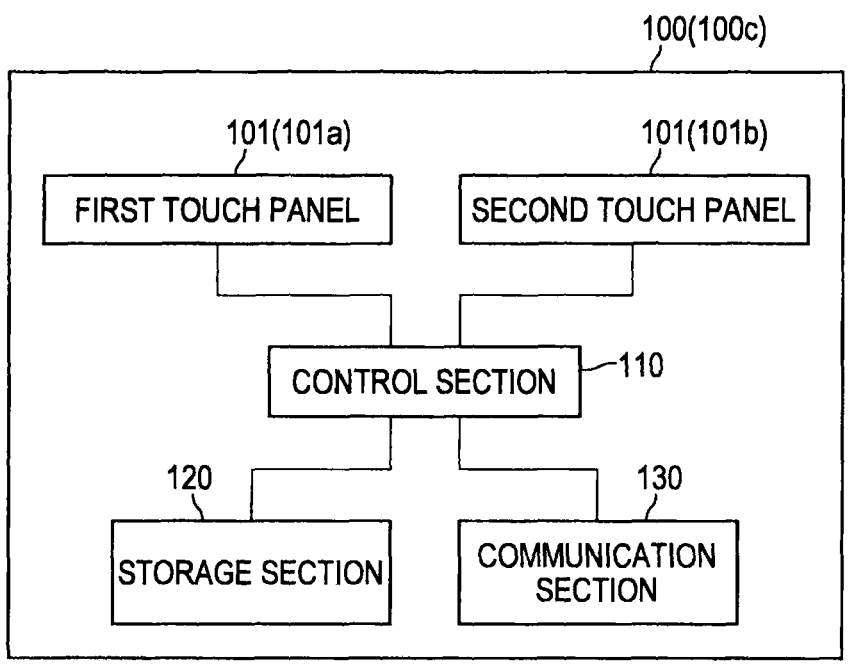
FIG. 16 is a block diagram showing a functional configuration of the information processing apparatus according to the third embodiment of the present invention.

FIG. 16 is a block diagram showing a functional configuration of the information processing apparatus according to the third embodiment of the present invention. As shown in FIG. 16, the information processing apparatus 100c differs from the information processing apparatus 100a according to the first embodiment of the present invention in that the information processing apparatus 100c further includes a communication section 130.

The communication section 130 includes a communication unit 109 and the like, and is capable of communicating with another device. For example, the communication section 130 may be capable of communicating with a server device as an example of another device via a network, or may be capable of communicating with another device connected to a leased line.

[3-3. Functional Configuration of Information Processing Apparatus (Control Section)]

Figure 17:
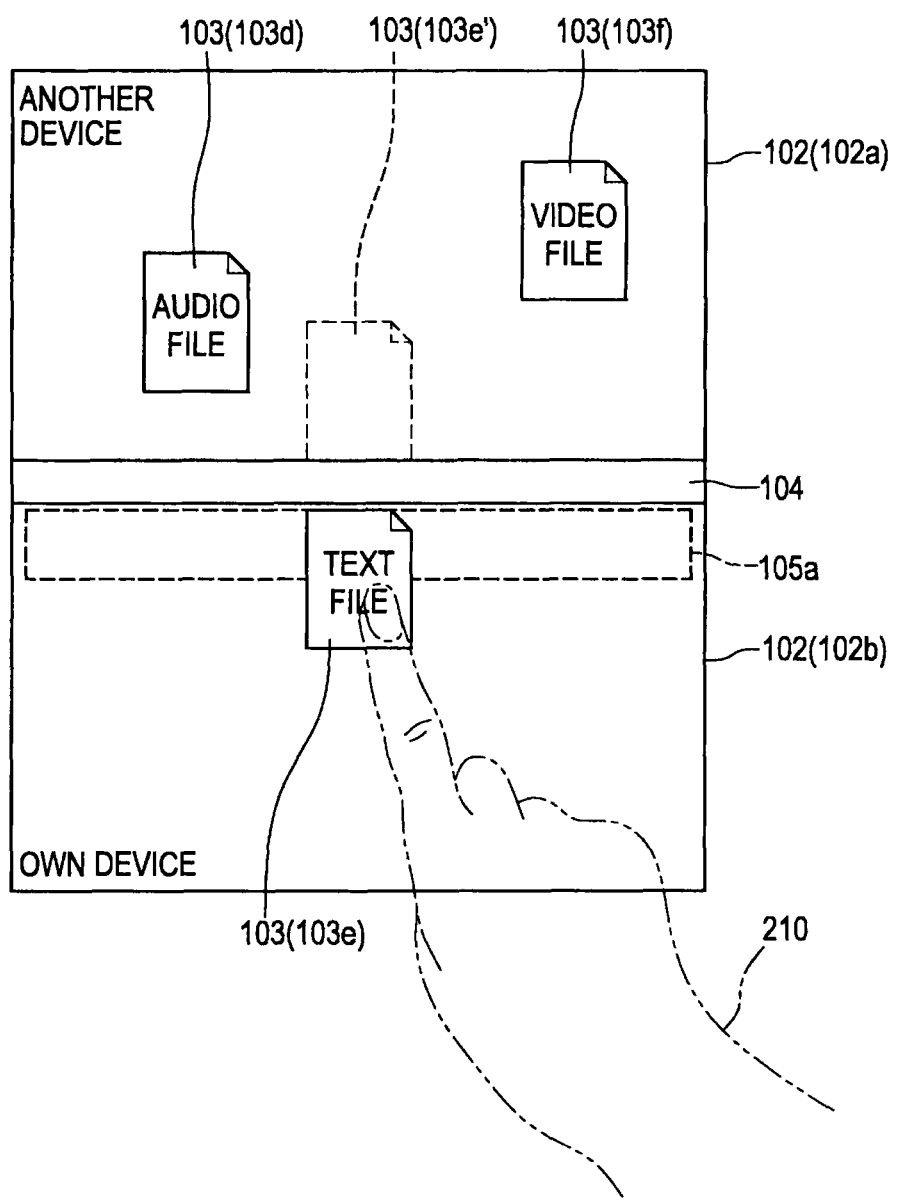
FIG. 17 is a diagram showing a state before a file is transmitted to another device in a case where the file is transmitted to the other apparatus while an object is being moved.
Figure 18:
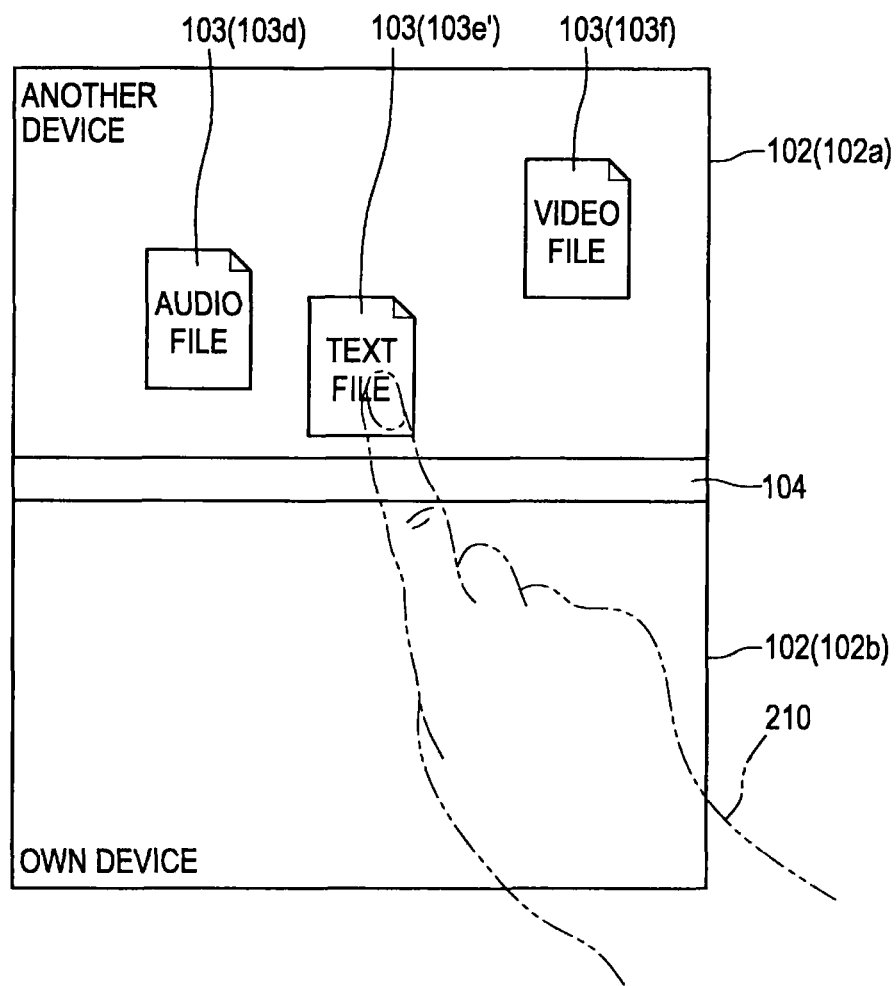
FIG. 18 is a diagram showing a state after the file is transmitted to the other apparatus in a case where the file is transmitted to the other apparatus while the object is being moved.
Figure 19:
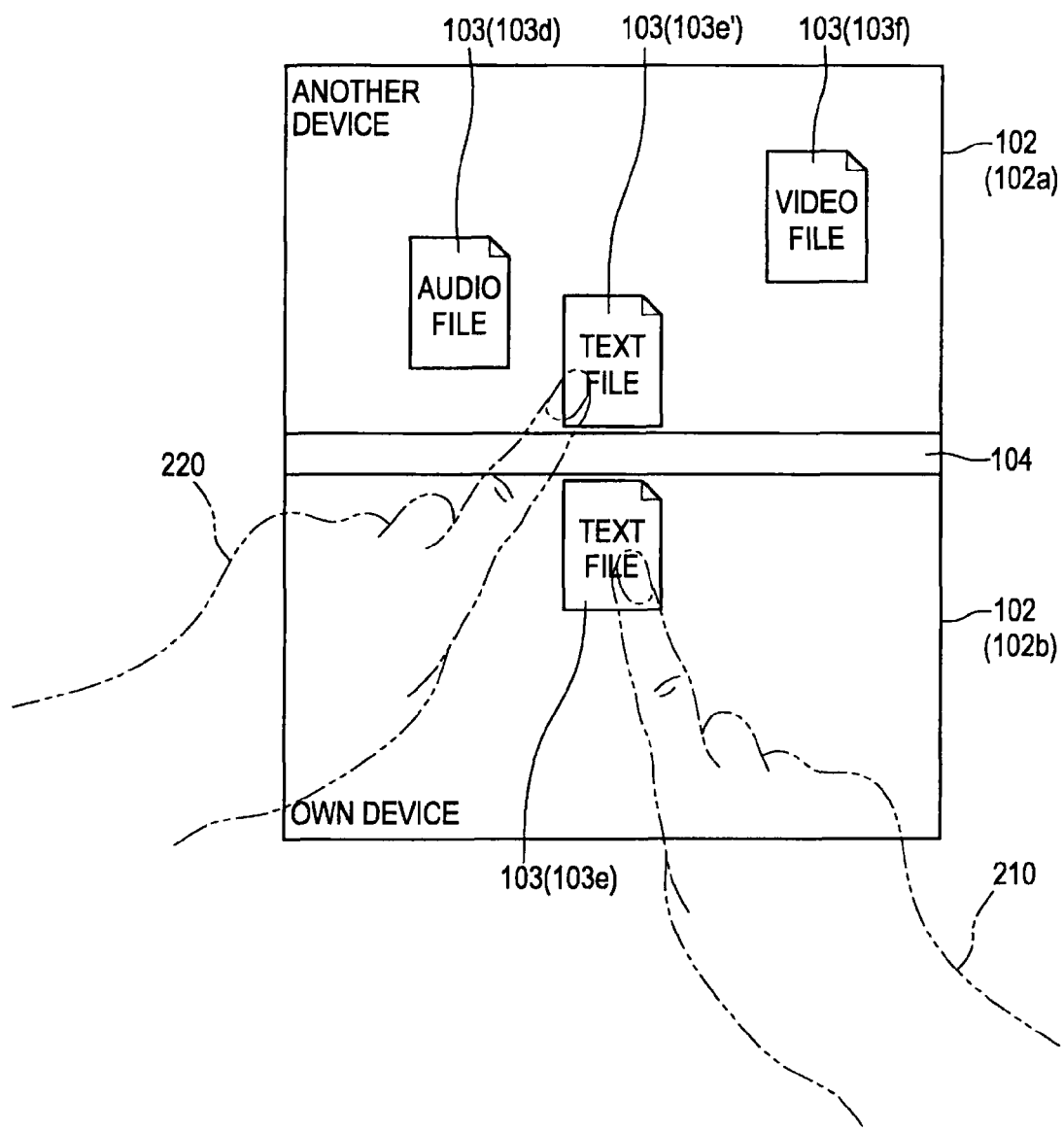
FIG. 19 is a diagram showing a state after a duplicate of the file is transmitted in a case where the duplicate of the file is transmitted while the object is being duplicated.

FIG. 17 is a diagram showing a state before a file is transmitted to another device in the case where the file is transmitted to the other apparatus while an object is being moved. FIG. 18 is a diagram showing a state after the file is transmitted to the other apparatus in the case where the file is transmitted to the other apparatus while the object is being moved. FIG. 19 is a diagram showing a state after a duplicate of the file is transmitted in the case where the duplicate of the file is transmitted while the object is being duplicated.

The storage section 120 further stores a first file (for example, a text file) including predetermined data (for example, text data). As shown in FIG. 18, if it is determined that an object 103 (103e) displayed in the first display surface 102a is selected by the operating body 210, the control section 110 may further cause the communication section 130 to perform processing to transmit the first file to the another device and may delete the first file from the storage section 120.

Further, as shown in FIG. 19, the control section 110 may determine that the object 103 (103e) displayed in the first display surface 102a and an object 103 (103e') displayed in the second display surface 102b are selected. In that case, the control section 110 may further cause the communication section 130 to perform processing to transmit a second file, which is obtained by duplicating the first file, to the another device and may leave the first file in the storage section 120.

4. Modified Examples of Embodiments of the Present Invention

It should be understood by those skilled in the art that various modifications, combinations, sub-combinations and alterations may occur depending on design requirements and other factors insofar as they are within the scope of the appended claims or the equivalents thereof.

5. Summary

According to the embodiments of the present invention, a drag and drop operation can be easily performed between a plurality of screens, and the operability of the user is improved. Further, according to the embodiments of the present invention, the following designs can be realized in a device having a plurality of touch panels: a design in which the screens are related to each other; and a GUI design which allows the plurality of screens to be effectively utilized to an extent that corresponds to a screen area obtained by adding the areas of the plurality of screens.

Further, a duplicate of the same object is displayed in another screen, and hence, an affordance to drag and drop the duplicate to the other screen can be obtained. Thus, because the object does not move spontaneously to the other screen when the operation is not performed, confusion of the operation is avoided.

In addition, exactly the same operation method can be employed for the drag and drop operation between three or more screens, and it can be applied to the case where an interaction is performed between a plurality of touch panels or between a plurality of devices.

The present application contains subject matter related to that disclosed in Japanese Priority Patent Application JP 2009-055565 filed in the Japan Patent Office on Mar. 9, 2009, the entire content of which is hereby incorporated by reference.

What is claimed is:

1. An information processing apparatus, comprising:
a first touch panel having a first contact surface which can come into contact with an operating body and capable of acquiring first contact coordinate information indicating a contact position on the first contact surface with the operating body and also having a first display surface and capable of displaying information in the first display surface;
a second touch panel having a second contact surface which can come into contact with the operating body and capable of acquiring second contact coordinate information indicating a contact position on the second contact surface with the operating body and also having a second display surface and capable of displaying information in the second display surface;
a storage section which stores object data specifying an object and object coordinate information indicating a position of the object on the first display surface; and
a control section which causes the object specified by the object data, which is stored in the storage section, to be displayed as a first object at a position indicated by the object coordinate information, when the first touch panel acquires the first contact coordinate information, determines whether the first object is selected by the operating body based on the first contact coordinate information and the object coordinate information, if it is determined that the first object is selected by the operating body, causes a second object, which is obtained by duplicating a part or all of the first object, to be displayed at a predetermined position on the second display surface, when the second touch panel acquires the second contact coordinate information, determines whether the second object is selected by the operating body based on the second contact coordinate information and in-second display surface destination coordinate information which indicates the predetermined position, and if it is determined that the second object is selected by the operating body, hides the first object displayed at the position indicated by the object coordinate information and also updates the object coordinate information with the in-second display surface destination coordinate information.

2. The information processing apparatus according to claim 1, wherein
the control section acquires movement information indicating a direction and a distance in which the operating body moves on the first contact surface while being in contact therewith, decides in-first display surface destination coordinate information, which is a destination of the first object within the first display surface, based on the movement information, updates the object coordinate information with the in-first display surface destination coordinate information and also moves the first object to a position indicated by the object coordinate information after being updated, determines, based on the object coordinate information after being updated and coordinate information within a predetermined region on the first display surface, whether the first object has entered the predetermined region, and, if it is determined that the first object has entered the predetermined region, determines that the first object is selected by the operating body and causes the second object to be displayed at the predetermined position.

3. The information processing apparatus according to claim 2, wherein
the storage section stores coordinate information of a predetermined point which forms the object and
the control section determines whether the coordinate information of the predetermined point corresponds to one of a plurality of pieces of coordinate information within the predetermined region, and, if the coordinate information of the predetermined point corresponds thereto, determines that the first object has entered the predetermined region.

4. The information processing apparatus according to claim 2, wherein
the storage section stores coordinate information of a predetermined point which forms the object and also stores information on shape and size of the object as the object data, and
the control section calculates a ratio of an area of a region which forms the first object and corresponds to one of a plurality of pieces of coordinate information within the predetermined region to an entire area of the first object based on the coordinate information of the predetermined point and the information on the shape and the size of the object, determines whether the calculated ratio exceeds a predetermined value, and, if it is determined that the ratio exceeds the predetermined value, determines that the first object has entered the predetermined region.

5. The information processing apparatus according to claim 1, wherein
the storage section stores coordinate information of a predetermined point which forms the object and also stores information on shape and size of the object as the object data, and
the control section calculates a ratio of an area of a region which forms the first object and is not displayed in the first display surface to an entire area of the first object based on the coordinate information of the predetermined point and the information on the shape and the size of the object, determines whether the calculated ratio exceeds a predetermined value, and, if it is determined that the ratio exceeds the predetermined value, determines that the first object is selected by the operating body and causes the second object to be displayed at the predetermined position.

6. The information processing apparatus according to claim 1, wherein
when the second touch panel acquires the second contact coordinate information and also the first touch panel acquires the first contact coordinate information, the control section determines whether the second object is selected by the operating body based on the second contact coordinate information and in-second display surface destination coordinate information which indicates the predetermined position and also determines whether the first object is selected by the operating body based on the first contact coordinate information and the object coordinate information, if it is determined that the first object and the second object are selected, omits processing that is used to hide the first object displayed at a position indicated by the object coordinate information, and registers the in-second display surface destination coordinate information as new object coordinate information other than the object coordinate information without updating the object coordinate information.

7. The information processing apparatus according to claim 1, wherein
when the first touch panel acquires the first contact coordinate information in a state in which the second object is displayed at the predetermined position, the control section determines whether the first object is selected by the operating body based on the first contact coordinate information and the object coordinate information, if it is determined that the first object is selected, omits processing to hide the object displayed at a position indicated by the object coordinate information, and hides the second object displayed at the predetermined position without updating the object coordinate information.

8. The information processing apparatus according to claim 1, wherein
if the control section acquires movement information indicating a direction and a distance in which the operating body moves on the first contact surface while being in contact therewith in a state in which the second object is displayed at the predetermined position, the control section causes the second object to move within the second display surface based on the movement information.

9. The information processing apparatus according to claim 1, wherein
if it is determined that the second object is not selected by the operating body for a predetermined time from a start of a display of the second object, the control section hides the second object displayed at the predetermined position.

10. The information processing apparatus according to claim 1, wherein
the control section causes the second object to be displayed at the predetermined position at a luminance lower than a luminance of the first object displayed at the position indicated by the object coordinate information, or in a translucent or blinking manner.

11. The information processing apparatus according to claim 1, further comprising
a third touch panel having a third contact surface which can come into contact with an operating body and capable of acquiring third contact coordinate information indicating a contact position on the third contact surface with the operating body and also having a third display surface and capable of displaying information in the third display surface, wherein
the control section causes a third object, which is further obtained by duplicating a part or all of the first object, to be displayed at a predetermined position on the third display surface if it is determined that the first object is selected by the operating body, further hides the third object displayed at the predetermined position on the third display surface if it is determined that the second object is selected by the operating body, and hides the first object displayed at the position indicated by the object coordinate information and the second object at the predetermined position on the second display surface and also updates the object coordinate information with in-third display surface destination coordinate information, which indicates a predetermined position on the third display surface, if it is determined that the third object is selected by the operating body.

12. The information processing apparatus according to claim 11, wherein
the control section acquires movement information indicating a direction and a distance in which the operating body moves on the first contact surface while being in contact therewith, decides in-first display surface destination coordinate information, which is a destination of the first object within the first display surface, based on the movement information, updates the object coordinate information with the in-first display surface destination coordinate information and also moves the first object to a position indicated by the object coordinate information after being updated, determines, based on the object coordinate information after being updated and coordinate information within a predetermined region on the first display surface, whether the first object has entered the predetermined region, and, if it is determined that the first object has entered the predetermined region, determines that the first object is selected by the operating body and causes the second object to be displayed at the predetermined position on the second display surface and also causes the third object to be displayed at the predetermined position on the third display surface.

13. The information processing apparatus according to claim 11, wherein
the control section acquires movement information indicating a direction and a distance in which the operating body moves on the first contact surface while being in contact therewith, decides in-first display surface destination coordinate information, which is a destination of the first object within the first display surface, based on the movement information, updates the object coordinate information with the in-first display surface destination coordinate information and also moves the first object to a position indicated by the object coordinate information after being updated, determines, based on the object coordinate information after being updated, coordinate information within a second predetermined region on the first display surface, and coordinate information within a third predetermined region on the first display surface, whether the first object has entered the second predetermined region or the third predetermined region, and, if it is determined that the first object has entered the second predetermined region, determines that the first object is selected by the operating body and causes the second object to be displayed at the predetermined position on the second display surface and if it is determined that the first object has entered the third predetermined region, determines that the first object is selected by the operating body and causes the third object to be displayed at the predetermined position on the third display surface.

14. The information processing apparatus according to claim 1, further comprising
a communication section capable of communicating with another device, wherein
the storage section further stores a first file including predetermined data, and
if it is determined that the second object is selected by the operating body, the control section further causes the communication section to perform processing to transmit the first file to the another device and deletes the first file from the storage section.

15. The information processing apparatus according to claim 6, further comprising
a communication section capable of communicating with another device, wherein
the storage section further stores a first file including predetermined data, and
if it is determined that the first object and the second object are selected, the control section further causes the communication section to perform processing to transmit a second file, which is obtained by duplicating the first file, to the another device and leaves the first file in the storage section.

16. An information processing method for a control section of an information processing apparatus including a first touch panel having a first contact surface which can come into contact with an operating body and capable of acquiring first contact coordinate information indicating a contact position on the first contact surface with the operating body and also having a first display surface and capable of displaying information in the first display surface, a second touch panel having a second contact surface which can come into contact with the operating body and capable of acquiring second contact coordinate information indicating a contact position on the second contact surface with the operating body and also having a second display surface and capable of displaying information in the second display surface, a storage section which stores object data specifying an object and object coordinate information indicating a position of the object on the first display surface, and the control section, comprising the steps of:

causing the object specified by the object data, which is stored in the storage section, to be displayed as a first object at a position indicated by the object coordinate information;

when the first touch panel acquires the first contact coordinate information, determining whether the first object is selected by the operating body based on the first contact coordinate information and the object coordinate information;

if it is determined that the first object is selected by the operating body, causing a second object, which is obtained by duplicating a part or all of the first object, to be displayed at a predetermined position on the second display surface;

when the second touch panel acquires the second contact coordinate information, determining whether the second object is selected by the operating body based on the second contact coordinate information and in-second display surface destination coordinate information which indicates the predetermined position; and if it is determined that the second object is selected by the operating body, hiding the first object displayed at the position indicated by the object coordinate information and also updating the object coordinate information with the in-second display surface destination coordinate information.

17. A transitory computer-readable medium storing a computer-executable program which, when executed by a processor, performs a method for causing a computer to function as an information processing apparatus, comprising:

a first touch panel having a first contact surface which can come into contact with an operating body and capable of acquiring first contact coordinate information indicating a contact position on the first contact surface with the operating body and also having a first display surface and capable of displaying information in the first display surface;

a second touch panel having a second contact surface which can come into contact with the operating body and capable of acquiring second contact coordinate information indicating a contact position on the second contact surface with the operating body and also having a second display surface and capable of displaying information in the second display surface;

a storage section which stores object data specifying an object and object coordinate information indicating a position of the object on the first display surface; and a control section which causes the object specified by the object data, which is stored in the storage section, to be displayed as a first object at a position indicated by the object coordinate information, when the first touch panel acquires the first contact coordinate information, determines whether the first object is selected by the operating body based on the first contact coordinate information and the object coordinate information, if it is determined that the first object is selected by the operating body, causes a second object, which is obtained by duplicating a part or all of the first object, to be displayed at a predetermined position on the second display surface, when the second touch panel acquires the second contact coordinate information, determines whether the second object is selected by the operating body based on the second contact coordinate information and in-second display surface destination coordinate information which indicates the predetermined position, and if it is determined that the second object is selected by the operating body, hides the first object displayed at the position indicated by the object coordinate information and also updates the object coordinate information with the in-second display surface destination coordinate information.

\* \* \* \* \*